Feb. 19, 1929.
W. N. BOOTH
1,702,377
VEHICLE WHEEL
Filed May 11, 1925
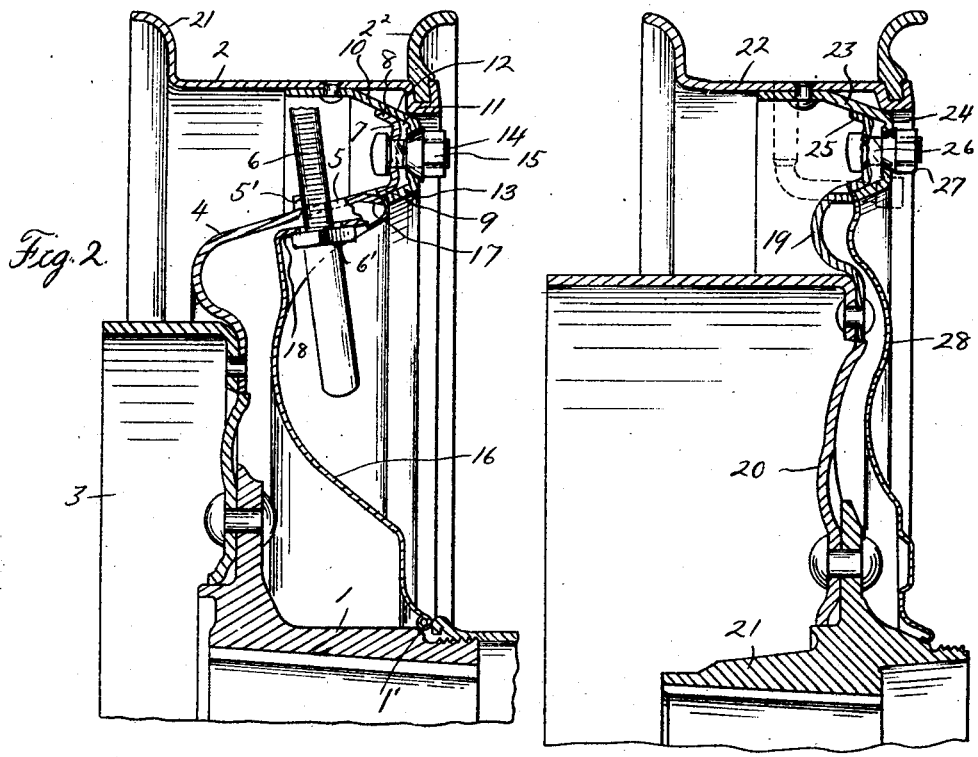
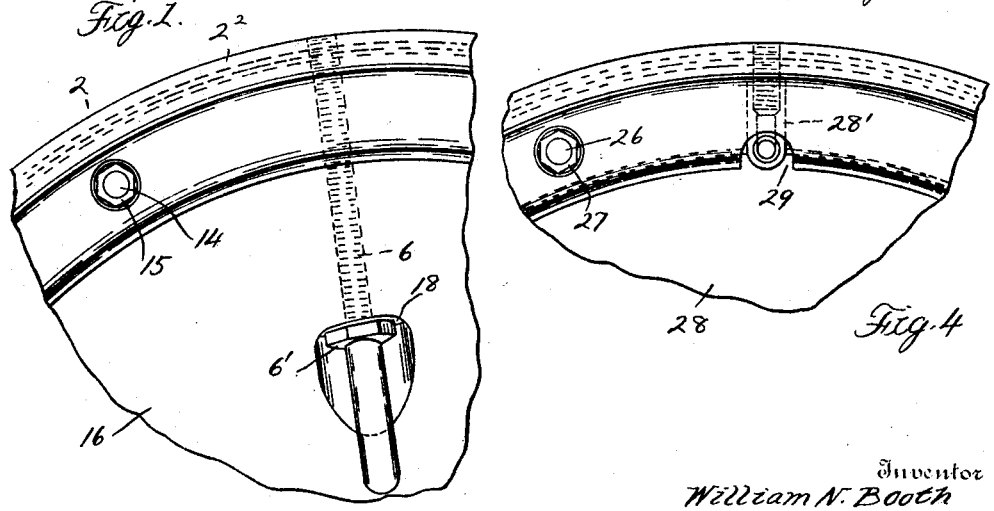
Inventor
William N. Booth
Attorneys Patented Feb. 19, 1929.

1,702,377

UNITED STATES PATENT OFFICE.

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK.

VEHICLE WHEEL.

Application filed May 11, 1925. Serial No. 29,610.

The invention relates to vehicle wheels and has for one of its objects the provision of an improved arrangement for detachably securing the rim upon the wheel body. Another object is to provide a simple arrangement for securing the wheel cover plate in place. With these as well as other objects in view the invention resides in the novel features of construction and combinations and arrangements of parts as more fully hereinafter set forth.

In the drawings:—

Figure 1 is a side elevation of a portion of a vehicle wheel embodying my invention;

Figure 2 is a transverse section therethrough;

Figure 3 is a similar view of a modified vehicle wheel;

Figure 4 is a side elevation of a portion of the wheel shown in Figure 3.

1 is the hub of a motor vehicle wheel and 2 the tire carrying rim having the fixed annular flange 2' and the detachable annular flange 2² for retaining the tire rim. The wheel body for carrying the rim upon the hub comprises the brake drum 3 and the spacing ring or spacer 4 of disk form rigidly secured to the web of the brake drum. The brake drum web is in the rear of the central plane of rotation of the wheel while the spacer crosses the central plane of rotation and is provided with the transverse slot 5 with the upwardly extending tongue 5' at the inner end of the slot, the slot permitting the passage of the tire valve stem 6 through the spacer and the tongue providing an extended bearing surface upon the valve stem.

For detachably securing the rim 2 upon the wheel body, the spacer has at its outer edge the inwardly opening channel shaped portion 7 with the inwardly diverging or flared outer and inner legs 8 and 9 respectively. The rim 2 has permanently secured thereto the ring 10 of disk form which has at its inner edge the inwardly opening channel shaped portion 11 with the inwardly diverging or flared outer and inner legs 12 and 13 respectively which are slidably engageable over the corresponding legs of the spacer channel shaped portion. The webs of the channel shaped portions are laterally spaced from each other and have extending therethrough the bolts 14 the outer ends of which are threadedly engaged by the nuts 15 having inner tapering ends engageable with the web of the channel shaped portion of the ring for detachably securing the ring and consequently the rim upon the spacer.

For securing the cover plate 16 in place at its outer edge I have provided upon the spacer 4 and radially inward relative to its channel shaped portion the forwardly extending struck out lugs 17 which form shoulders engageable by the cover plate. The inner leg 13 of the channel shaped portion of the ring is engageable with the outer edge portion of the cover plate to clamp the same against the shoulders formed by the lugs 17, the arrangement being such that when mounting the rim upon the spacer the legs of the channel shaped portion of the ring ride over the legs of the channel shaped portion of the spacer to properly position the ring relative to the spacer. The inner leg of the channel shaped portion of the ring clamps the cover plate against the shoulders formed by the lugs and upon continued tightening of the nuts 15 upon the bolts 14 the ring will then fulcrum about the portion of the cover plate clamped against the lugs bringing the outer leg of the channel shaped portion of the ring into firm engagement with the outer leg of the channel shaped portion of the spacer. By reason of the webs of the channel shaped portions being laterally spaced these channel shaped portions are resiliently secured to each other which consists in securing the nuts upon the bolts so that they will not become accidently loosened.

For securing the cover plate 16 in place at its inner edge I have provided the hub 1 with the flared shoulder 1' against which the beaded inner edge of the cover plate is forced by means of the hub cap.

The cover plate 16 has an outwardly depressed portion 18, the base of which preferably extends at right angles to the valve stem 6 and is engageable with the clamping nut 6' upon the valve stem.

With the vehicle wheel shown in Figure 3 the parts have the same general arrangement with the exception that the wheel body is completely at the front side of the central plane of rotation of the wheel. In detail the spacer 19 and the web 20 of the brake drum are rigidly secured to each other and this web is also rigidly secured to the hub 21 of the wheel. The rim 22 for carrying the tire has permanently secured thereto the ring 23 which has the inwardly opening channel shaped portion 24 at its inner edge which is engageable over the inwardly opening channel shaped portion 25 at the outer edge of the spacer, these channel shaped portions being secured to each other by the bolts 26 and the nuts 27. The cover plate 28 is also secured in place by the same means as that shown in Figures 1 and 2. The arrangement of spacer and cover plate as well as ring permanently secured to the rim differ, however, for receiving the valve stem, which, as shown in the present instance, is a bent stem having a radial portion and a transverse portion. The channel shaped portion of the spacer preferably has the radial slot 28' therein through which the valve stem extends and the inner leg of the channel shaped portion of the ring is preferably notched at 29 in registration with the slot 28' to permit of the passage of the outer end of the valve stem. The cover plate preferably terminates radially inside the valve stem and consequently does not have any special provision for taking care of this valve stem.

What I claim as my invention is:

1. In a vehicle wheel, the combination with a wheel body, of a rim, means permanently secured to and carrying said rim and providing a portion for fulcruming about said wheel body and a second portion for seating upon said wheel body, and means upon said wheel body providing for fulcruming of said first mentioned portion.

2. In a vehicle wheel, the combination with a wheel body, of a rim, a ring permanently secured to and carrying said rim and provided with a portion for fulcruming about said wheel body and a second portion for seating upon said wheel body, and means upon said wheel body providing for fulcruming of said first mentioned portion.

3. In a vehicle wheel, the combination with a wheel body having a shoulder and a flared seat radially outward relative to said shoulder, of a rim and a ring permanently secured to said rim and having a channel shaped portion with a leg engageable with said shoulder and a flared leg engageable with said flared seat.

4. In a vehicle wheel, the combination with a disk having a channel shaped portion at its outer edge and provided with struck out lugs adjacent to said channel shaped portion, of a rim, and a ring permanently secured to said rim and having a channel shaped portion at its inner edge engageable with said first mentioned channel shaped portion and adapted to fulcrum about said lugs.

5. In a vehicle wheel, the combination with a wheel body and a cover plate, of a rim, and means permanently secured to said rim and arranged to clamp said cover plate against said wheel body and to seat upon said wheel body.

6. In a vehicle wheel, the combination with a disk having a flared seat and a cover plate, of a rim, and a ring permanently secured to said rim and engaging said flared seat and provided with means for clamping said cover plate to said disk.

7. In a vehicle wheel, the combination with a disk having at its outer edge an inwardly opening channel shaped portion, forwardly extending struck out lugs extending adjacent to said channel shaped portion and a cover plate, of a rim, and a ring permanently secured to said rim and having at its inner edge an inwardly opening channel shaped portion with legs engageable over the legs of said first mentioned channel shaped portion, one of the legs of said ring channel shaped portion engageable with said cover plate to clamp the same against said lugs, and the webs of the channel shaped portions being spaced from each other, and securing means extending through the webs of said channel shaped portions.

8. In a vehicle wheel, the combination with a wheel body and a cover plate, of a rim, and means permanently secured to and carrying said rim and arranged to fulcrum upon said cover plate and to seat upon said wheel body, said means cooperating with said wheel body to clamp said cover plate in place.

9. In a vehicle wheel, the combination with a wheel body having a shoulder and a seat, of a rim, and means for mounting said rim upon said wheel body including a channel-shaped member secured to said rim and having a leg adapted to fulcrum upon said shoulder and a second leg adapted to engage said seat.

10. In a vehicle wheel, the combination with a disk having a channel-shaped portion at its outer edge and a shoulder formed upon one of the legs of the channel-shaped portion, of a rim, and a substantially channel-shape ring having one of the legs thereof secured to said rim and seated upon the channel-shaped portion aforesaid of the disk, the other leg of said channel-shaped ring adapted to engage and fulcrum about said shoulder, the webs of the channel-shaped portions being spaced from each other, and securing means extending through the webs of said channel-shaped portions.

In testimony whereof I affix my signature.

WILLIAM N. BOOTH.